United States Patent
Carl et al.

(10) Patent No.: US 8,191,256 B2
(45) Date of Patent: Jun. 5, 2012

(54) METHOD FOR PRODUCING A HEAT EXCHANGER HAVING A CORROSION PROTECTION LAYER

(75) Inventors: Martin Carl, Witten (DE); Michael Herbermann, Gladbeck (DE); Eckhard Volkmer, Ratingen (DE); Raimund Witte, Dortmund (DE)

(73) Assignee: GEA Energietechnik GmbH, Bochum (DE)

( * ) Notice: Subject to any disclaimer, the term of this patent is extended or adjusted under 35 U.S.C. 154(b) by 669 days.

(21) Appl. No.: 12/307,847

(22) PCT Filed: Jun. 26, 2007

(86) PCT No.: PCT/DE2007/001133
§ 371 (c)(1),
(2), (4) Date: Jan. 7, 2009

(87) PCT Pub. No.: WO2008/049383
PCT Pub. Date: May 2, 2008

(65) Prior Publication Data
US 2009/0307907 A1 Dec. 17, 2009

(30) Foreign Application Priority Data

Oct. 24, 2006 (DE) .......................... 10 2006 050 681

(51) Int. Cl.
*B21D 53/06* (2006.01)
(52) U.S. Cl. ................. 29/890.046; 29/890.03; 165/133
(58) Field of Classification Search ............... 29/890.03, 29/890.031, 890.032, 890.045, 890.046, 29/890.053, 890.054, 527.1, 527.2, 527.6, 29/557; 165/133, 177, DIG. 513; 228/219, 228/233, 224
See application file for complete search history.

(56) References Cited

U.S. PATENT DOCUMENTS

| | | | | |
|---|---|---|---|---|
| 4,389,463 | A | * | 6/1983 | Smeggil et al. ............... 428/659 |
| 5,042,574 | A | | 8/1991 | Cottone et al. |
| 5,305,945 | A | * | 4/1994 | Cottone et al. ................ 228/183 |
| 5,316,206 | A | * | 5/1994 | Syslak et al. .................. 228/183 |
| 5,732,767 | A | * | 3/1998 | Saperstein .................... 165/133 |
| 6,715,667 | B2 | * | 4/2004 | Korischem et al. ........... 228/183 |
| 6,848,609 | B2 | * | 2/2005 | Korischem et al. ........... 228/183 |
| 2004/0149811 | A1 | | 8/2004 | Korischem et al. |
| 2006/0086486 | A1 | * | 4/2006 | Sudo ............................. 165/143 |
| 2007/0251091 | A1 | * | 11/2007 | Minami et al. ........... 29/890.054 |

FOREIGN PATENT DOCUMENTS

| | | |
|---|---|---|
| EP | 1 250 208 B1 | 10/2004 |
| WO | WO 01/54840 A | 8/2001 |

* cited by examiner

*Primary Examiner* — David Bryant
*Assistant Examiner* — Ryan J Walters
(74) *Attorney, Agent, or Firm* — Henry M. Feiereisen; Ursula B. Day

(57) ABSTRACT

Method for producing a heat exchanger with the following steps: a) hot dip refining a steel sheet to form a corrosion-protection layer (3), wherein the corrosion-protection layer (3) contains zinc and between 0.5% and 60% aluminum; b) removal of the corrosion-protection layer (3) from one side of the steel sheet; c) production of a heat exchanger tube (2) from this steel sheet, wherein the corrosion-protection layer (3) is arranged on the outside; d) provision of ribs (6) of aluminum or an aluminum alloy; e) provision of a flux; f) provision of a filler material (8) containing aluminum and silicon in the connecting region between the ribs (6) and the outside of the heat exchanger tube (2); g) connection of the heat exchanger tube (2) to the ribs (6) in a brazing operation.

14 Claims, 1 Drawing Sheet

METHOD FOR PRODUCING A HEAT EXCHANGER HAVING A CORROSION PROTECTION LAYER

BACKGROUND OF THE INVENTION

The invention relates to a method for producing a heat exchanger.

For many years, air-cooled heat exchangers have been used particularly in power plants for re-cooling of steam. These heat exchangers are configured as rows of heat exchanger bundles arranged in an A-shape, where the steam is condensed inside pipes. Heat transfer to the ambient air is improved by fins connected with the pipes. To guarantee a service life of at least several decades for these air-cooled heat exchangers, corrosion resistance is important. Several attempts have been made to construct the heat exchanger pipes of heat exchangers to resist corrosion. For example, U.S. Pat. No. 5,042,574 discloses to connect flat pipes plated with aluminum with corrugated folded aluminum fin webs in an annealing furnace by using an aluminum-silicon solder. Disadvantageously, this type of soldered connection can only be attained by using aluminum-plated flat pipes or by using plated aluminum fins. In addition to the comparatively complex process based on diverse materials, the flat pipes which are circumferentially closed by at least one longitudinal weld seam must not be plated with aluminum in the weld zone, because otherwise a trouble-free weld cannot be guaranteed. Brazing flat pipes made of steel to folded aluminum fin strips is problematic because soldering must be performed at relatively high temperatures of the order of around 600° C., i.e., close to the softening temperature of aluminum. The required solder typically consists of an aluminum-silicon eutectic having a melting point slightly below the softening point of aluminum. Selecting the flux which has to remove the oxide layers of the connection areas before the solder melts, but also becomes a liquid close to the softening temperature, also poses problems. The correct temperature profile for soldering can therefore be often only determined empirically.

Because aluminum and steel have different thermal expansion coefficients, the high soldering temperatures and subsequent cooling to ambient temperature can result in large material stresses, causing distortion of the connected parts and possible breakage at the solder joint, because the aluminum plating may not have been applied flawlessly or because a steel-aluminum intermediate layer may have formed between the steel pipe and the aluminum plating, as a result of melting of the aluminum layer during the brazing operation.

EP 1 250 208 B1 proposes to reduce the soldering temperature from conventionally about 600° C. to a range between 370° C. and 470° C. by using zinc-aluminum-alloys and special fluxes based on cesium-aluminum-tetrafluoride. The lower temperatures also cause less material stress; however, because of the heavy metal fraction special protective measures must be taken to handle the flux in order to prevent contamination of the environment.

SUMMARY OF THE INVENTION

It is therefore an object of the invention to provide a method for producing a heat exchanger, wherein fins made of aluminum or an aluminum alloy are attached on a heat exchanger pipe made of steel sheet having a solderable corrosion protection layer on the exterior surface, and wherein fluxes containing heavy metals are eliminated. The method also ensures that no troublesome iron-aluminum-intermediate metal compound or intermediate phases of this compound are formed between the corrosion protection layer and the steel pipe, so that a secure connection between the fins and the heat exchanger pipe is guaranteed also at higher soldering temperatures.

According to one aspect of the invention, the object is attained by a method for producing a heat exchanger with the following steps: a) processing a steel sheet by hot-dipping to form a corrosion protection layer, wherein the corrosion protection layer includes zinc and between 0.5% and 60% aluminum. b) removing the corrosion protection layer from one side of the steel sheet, c) fabricating a heat exchanger pipe from this steel sheet, wherein the corrosion protection layer is disposed on the outside, d) providing fins made of aluminum or of an aluminum alloy, e) providing a flux; f) providing a solder containing aluminum and silicon in the joining region between the fins and the outside of the heat exchanger pipe, and g) joining the heat exchanger pipe with the fins in a brazing operation.

According to another aspect of the invention, the object is attained by a method for producing a heat exchanger with the following steps: a) processing a steel sheet by hot-dipping to form a corrosion protection layer, wherein the corrosion protection layer includes zinc, between 0.5% and 60% aluminum and silicon, b) removing the corrosion protection layer from one side of the steel sheet, c) fabricating a heat exchanger pipe from this steel sheet, wherein the corrosion protection layer is disposed on the outside, d) providing fins made of aluminum or of an aluminum alloy, e) providing a flux, f) providing a solder (8) containing aluminum and zinc in the joining region between the fins and the outside of the heat exchanger pipe having the corrosion protection layer, g) joining the heat exchanger pipe with the fins in a brazing operation.

According to the method of the invention, the steel sheet employed in producing the heat exchanger pipes is processed by a hot-dipping. With the hot-dipping process, a corrosion protection layer is deposited on the processed products which protects the substrate from corrosive attacks.

The flat part used in the hot-dip process is typically cleaned, recrystallized or heated in a continuous furnace and cooled to the temperature of the metal melt, before the actual hot-dipping process is carried out in a molten metal bath. When the substrate is transported through the bath, both sides are coated with the corrosion protection layer.

However, heat exchanger pipes require corrosion protection only on the outside. It is known to dip the entire heat exchanger pipe which is sealed at both ends into a metal melt in order to deposit a corrosion protection layer over the entire heat exchanger pipe including the fins. However, because the fin surface is considerably larger than the surface of the heat exchanger pipe, a large quantity of the metal melt is required, which increases the costs of heat exchangers for condensation of steam in power plants due to their large size. Typically, the heat exchanger pipes are between 6 and 12 m long which also necessitates correspondingly large hot-dipping facilities. In addition, the high temperatures in a subsequent hot-dipping process can induce stress in the part, causing the part to distort.

Conversely, with the method of the invention, the corrosion protection layer is first applied by a hot-dipping process and later removed, in particular mechanically, from one side of the steel sheet. The side, from which the corrosion protection layer has been removed in this manner, subsequently forms the interior surface of the heat exchanger pipe, which is made of this steel sheet. The corrosion protection layer is therefore only disposed only on the outside of the heat exchanger pipe. This production method of a heat exchanger pipe coated only on the outside is in the end cost-effective and therefore very economical even when taking into account the equipment needed to later remove the corrosion protection layer.

The method of the invention can be used, in particular, for producing heat exchangers for the condensation of steam in power plants, because the water chemistry for the feed water generally requires that surfaces which come into contact with the steam are free from non-iron metals, such as aluminum or copper. In addition, a magnetite layer which protects the heat exchanger pipe from interior corrosion is formed in the condensation process, obviating the need for an additional corrosion protection on the inside.

With the invention, corrosion protection layers can advantageously be used on the outside which contain zinc and between 0.5% and 60%, preferably between 4% and 55%, aluminum. The presence of zinc prevents or reduces the harmful formation of intermetallic iron-aluminum-intermediate layers or intermediate phases of the iron-aluminum compound, which could cause spalling of the conventionally aluminized steel pipes during subsequent brazing. Because formation of the harmful intermetallic iron-aluminum-intermediate layers does no longer have the same significance as before, the production methods is simplified considerably, because the parameter ranges of temperature and duration for producing the brazed connection can be expanded compared to conventional brazed connections when employing aluminum-plated steel pipes.

Advantageously, cesium-containing flux can be eliminated. Instead, a flux based on potassium-aluminum-tetrafluoride can be used, together with a solder containing aluminum and silicon.

In a first embodiment of the method of the invention, fins are plated with the solder material at least in certain areas. In particular, both sides of the fins which are part of a corrugated fin strip are plated with the solder in order to connect the heat exchanger pipe to the sides of the fin strips facing the surface of the heat exchanger pipe. The heat exchanger pipe is soldered to the fins in the arcuate regions of the corrugated fin strip. The plated solder melts during the soldering process and flows into the corresponding soldering gaps between the parts to be connected.

In an alternative embodiment, the fins are not plated, i.e., are not coated with a solder, and solder is introduced separately into the soldering gap between the fins and the heat exchanger pipe. By employing this procedure, more advantageous starting materials can be used for the fins. A reliable solder joint can therefore be produced even if the solder is separately introduced into the soldering gap.

In the third embodiment of the method, supplying solder and plating solder onto the fins can be eliminated by forming the corrosion protection layer from an alloy containing zinc and between 0.5% and 60% aluminum as well as silicon, wherein the solder is formed by the corrosion protection layer itself. Also in this approach, the steel sheet is not plated with an aluminum layer, but is provided with a corrosion protection layer applied in a hot-dip process, which simultaneously forms the solder. It would also be possible in this embodiment to add solder separately into the connection region. Off course, it should also not be excluded that the fins are also plated with solder. All three embodiments can also be combined with one another, wherein the particular embodiment where the corrosion protection layer on the heat exchanger pipe also forms the required solder for the soldering process, is the most attractive solution from a processing and economical aspect.

Regardless which of the embodiments is employed, the corrosion protection layer is advantageously produced by hot-dipping in a bath containing 55% aluminum, 43.4% zinc and 1.6% silicon. With the method of the invention, an upper limit of 60% aluminum is viewed as appropriate in the corrosion protection layer. Fundamentally, corrosion protection layers with significantly lower aluminum concentration could also be employed in the process. In particular, the aluminum fraction may be smaller than 50%. In another embodiment, the corrosion protection layer may be produced by hot-dipping from a zinc bath with 5% aluminum, silicon and traces of rare earth metals.

The employed flux also plays a significant role when soldering aluminum. In preparation for soldering, the surface of the joining zone must be cleaned down to bare metal by removing the permanent oxide layers and must then be protected from renewed oxide formation during soldering by using flux. It has been observed that fluxes made of potassium and aluminum fluorides ($KAlF_4$) are particularly beneficial. In particular, the method should be performed under controlled atmosphere (CAB), in particular in a nitrogen atmosphere.

Because with the method of the invention one of the corrosion protection layers will be mechanically removed, the corrosion protection layers applied to the steel sheet can advantageous have different thicknesses, with the thinner of the corrosion protection layers then being removed. This results in less waste of the coating material which is more noble than the steel, and reduced costs associated with removing the corrosion protection layer.

The corrosion protection layer is preferably removed mechanically, in particular by metal cutting. This can be accomplished by using rotating brushes, because the brush geometry simultaneously allows fine surface machining. The corrosion protection layers applied with the hot-dipping process have typically a smaller thickness, so that the rotating brush tools are particularly suited to economically remove these thinner layers. However, for greater layer thicknesses, a planing a or scraping tool for coarse machining of the strip material may be positioned up front. Experiments have shown that favorable results are obtained when using brush heads equipped with diamonds. Such brush heads can be designed to have a long service life and also a high material-removal efficiency.

It will be understood that in the context of the invention additional fine machining steps may be included following the mechanical removal with rotating brushes, if required. For example, the surface may be machined by grinding subsequent to the processing with a brush to a process, wherein surfaces with a grain size of 240-1000 microns can be attained per grinding head by brush processing alone, without requiring micro-finishing.

BRIEF DESCRIPTION OF THE DRAWING

The invention will now be described in more detail with reference to an exemplary embodiments illustrated in the drawings.

DETAILED DESCRIPTION OF PREFERRED EMBODIMENTS

Figure 1:
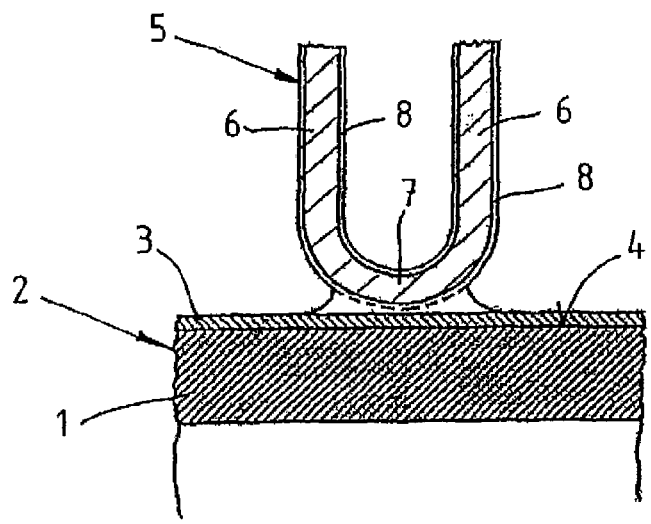
FIG. 1 shows a longitudinal cross-section through the wall of a pipe of a heat exchanger with fins arranged along the circumference.
Figure 2:
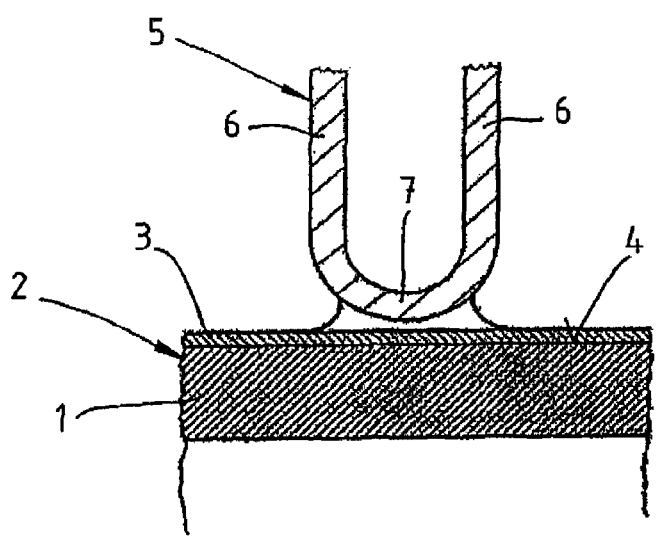
FIG. 2 shows another embodiment in a diagram similar to that of FIG. 1.
Figure 3:
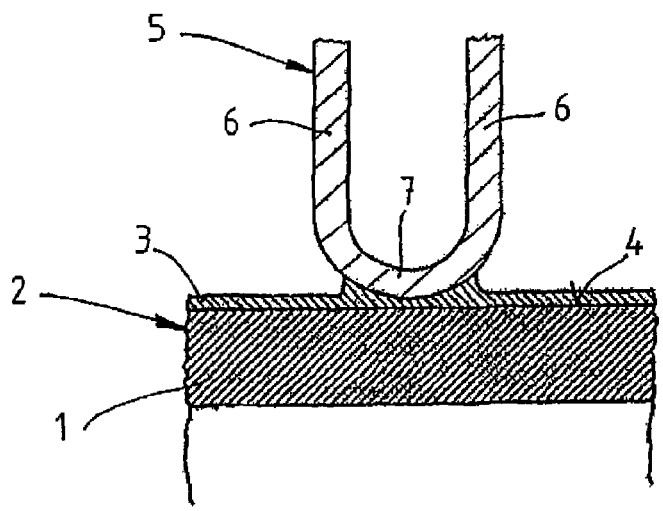
FIG. 3 shows a third embodiment in a diagram similar to that of FIG. 1.

In FIGS. 1 to 3, the reference symbol 1 refers to the wall of a heat exchanger pipe 2 made of carbon steel for a heat exchanger (not shown) in form of an air-cooled condensation system for steam turbines. The heat exchanger pipe 2 can have a length between 6 and 12 m. According to the embodiment of FIG. 1, the heat exchanger pipe is provided with a corrosion protection layer 3 which contains zinc (Zn) and aluminum (Al). The corrosion protection layer 3 is applied to the exterior surface 4 of the wall 1 by hot-dipping.

FIG. 1 also shows that a corrugated fin strip 5 is affixed to the illustrated wall 1 of the heat exchanger pipe 2. The fin strip 5 is composed of several parallel fins 6 which are connected by arcuate sections 7 to form a single piece. The fin strip 5 consists of aluminum and is plated on both sides with a solder 8 containing aluminum and silicon, which melts during the soldering process. The solder 8 contains between 7.5% and 12% silicon. Potassium-aluminum-tetrafluoride ($KAlF_4$) is added in the soldering process in a controlled furnace atmosphere as a flux. During the soldering process, the solder 8 displaces the flux (not shown), resulting in a joint between the corrosion protection layer 3 and the arcuate section 7 of the fin strip 5. During the soldering process, diffusion exchange takes place between the atoms within a very thin zone at the interface of the components to be joined together. Because the corrosion protection layer 3 has preferably 55% aluminum, 43.4% zinc and 1.6% silicon, the presence of zinc causes a unyielding connection between the heat exchanger pipe 2 made of steel and the corrosion protection layer 3, without any noticeable formation of an iron-aluminum intermediate layer, which would impair the strength.

The embodiment depicted in FIG. 2 is different from that depicted in FIG. 1 in that the solder 8 is not plated onto the fins 6, but is introduced separately into the soldering gap by using a flux made of potassium fluoride and aluminum fluoride.

In the third embodiment depicted in FIG. 3, soldering additives in form of plated fins, as illustrated in FIG. 1, were omitted. Moreover, the separate solder illustrated in FIG. 2 was not supplied. Instead, the corrosion protection layer 3 is composed of an alloy made from 55% aluminum, 43.4% zinc and 1.6% silicon, which was applied to the heat exchanger pipe 2 by hot-dipping and which is melted during soldering by using $KAlF_4$ as flux, so that the corrosion protection layer 3 is in direct contact with both the fins 6 and the heat exchanger pipe 2. With the zinc and aluminum fraction in the corrosion protection layer 3, a joint can be produced between the fins 6 made of aluminum and the heat exchanger pipe 2 made of a steel material.

What is claimed is:

1. A method for producing a heat exchanger, comprising the steps of:
    forming a corrosion protection layer comprising zinc and between 0.5% and 60% aluminum on a steel sheet by hot-dipping;
    removing the corrosion protection layer from a first side of the steel sheet;
    constructing a heat exchanger pipe from the steel sheet, with the corrosion protection layer remaining on a second side of the steel sheet forming an exterior surface of the heat exchanger pipe; and
    joining fins made of aluminum or of an aluminum alloy to the exterior surface of the heat exchanger pipe by brazing with a solder containing aluminum and silicon and a flux.

2. The method of claim 1, wherein at least some regions of the fins are plated with the solder.

3. The method of claim 1, wherein the joining step includes the steps of introducing the solder into a soldering gap between unplated fins and the heat exchanger pipe, and brazing the unplated fins to the heat exchanger pipe.

4. The method of claim 1, wherein the corrosion protection layer is produced by hot-dipping the steel sheet into a bath containing 55% aluminum, 43.4% zinc and 1.6% silicon.

5. The method of claim 1, wherein the corrosion protection layer is produced by hot-dipping the steel sheet into a zinc bath containing 5% aluminum, silicon and traces of rare earth metals.

6. The method of claim 1, wherein the flux is a potassium-aluminum-tetrafluoride compound.

7. The method of claim 1, wherein the corrosion protection layer formed on the first side of the steel sheet is thinner than the corrosion protection layer formed on the second side of the steel sheet.

8. The method of claim 1, wherein the corrosion protection layer is mechanically removed from the first side.

9. A method for producing a heat exchanger, comprising the steps of:
    forming a corrosion protection layer comprising zinc and between 0.5% and 60% aluminum and silicon on a steel sheet by hot-dipping;
    removing the corrosion protection layer from a first side of the steel sheet;
    constructing a heat exchanger pipe from the steel sheet, with the corrosion protection layer remaining on a second side of the steel sheet forming an exterior surface of the heat exchanger pipe; and
    introducing a solder containing aluminum and zinc and a flux in a joining region between fins made of aluminum or of an aluminum alloy and the exterior surface of the heat exchanger pipe; and
    joining the fins to the exterior surface of the heat exchanger pipe by brazing.

10. The method of claim 9, wherein the corrosion protection layer is produced by hot-dipping the steel sheet into a bath containing 55% aluminum, 43.4% zinc and 1.6% silicon.

11. The method of claim 9, wherein the corrosion protection layer is produced by hot-dipping the steel sheet into a zinc bath containing 5% aluminum, silicon and traces of rare earth metals.

12. The method of claim 9, wherein the flux is a potassium-aluminum-tetrafluoride compound.

13. The method of claim 9, wherein the corrosion protection layer formed on the first side of the steel sheet is thinner than the corrosion protection layer formed on the second side of the steel sheet.

14. The method of claim 10, wherein the corrosion protection layer is mechanically removed from the first side.

\* \* \* \* \*